Sept. 7, 1965 F. J. AGES 3,204,921

SNAP-ACTING THERMOSTATIC VALVE

Filed Nov. 13, 1962

INVENTOR.
FREDERIK J. AGES

BY *Alan M. Staubly*

ATTORNEY

United States Patent Office 3,204,921
Patented Sept. 7, 1965

3,204,921
SNAP-ACTING THERMOSTATIC VALVE
Frederik J. Ages, Rolling Hills Estates, Calif., assignor to Honeywell Inc., a corporation of Delaware
Filed Nov. 13, 1962, Ser. No. 237,203
7 Claims. (Cl. 251—75)

This invention relates to thermostatically operated gas valves and, more particularly, to a thermostatic gas valve of the snap-acting type.

While valves of this general type are well known in the art, it is one of the objects of this invention to produce an inexpensive and more easily assembled valve of the above-mentioned type which contains more compact operating mechanism and yet provides improved and reliable operation.

It is another object of the invention to provide, in a snap-acting thermostatic gas valve, an arrangement wherein a clamping sleeve for a diaphragm also serves as a guide means for the actuating mechanism of the valve.

Another object of the invention is to provide, in a thermostatic gas valve of the snap-action type, a spring loading disc between the actuator and the snap-acting mechanism along with a strain release arrangement that will prevent damage to the disc.

Still another object of the invention is to combine the features mentioned in the other objects of the invention into a unitary gas valve sub-assembly for addition to any one of a plurality of valve bodies.

A still further object of the invention is to provide a thermostatic gas valve sub-assembly wherein a single spring and a flanged guide sleeve serve the dual function of clamping a diaphragm seal for the valve actuating mechanism and for guiding and resiliently urging the valve actuating mechanism in a direction to cause the actuating means to follow the movement of a detachable power unit.

Other objects of the invention will become apparent upon reading the following detailed description of the invention in conjunction with the accompanying drawing wherein.

Figure 1:
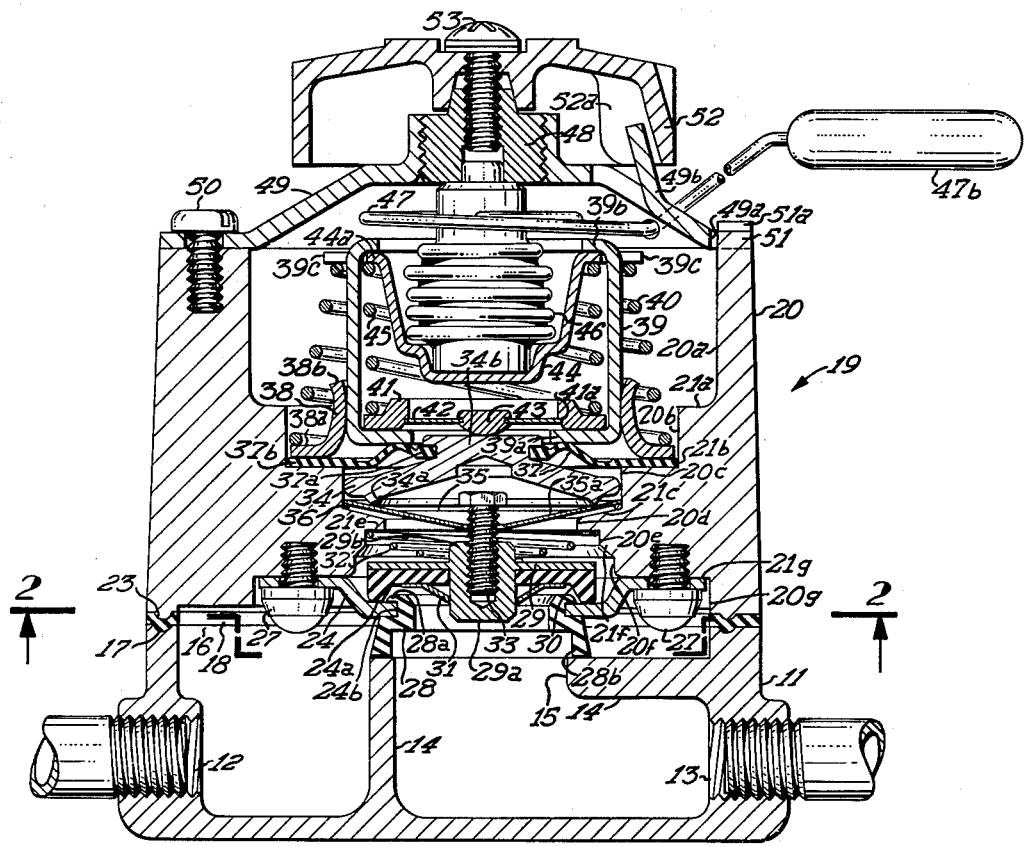
FIGURE 1 is a vertical sectional view through the gas valve.
Figure 2:
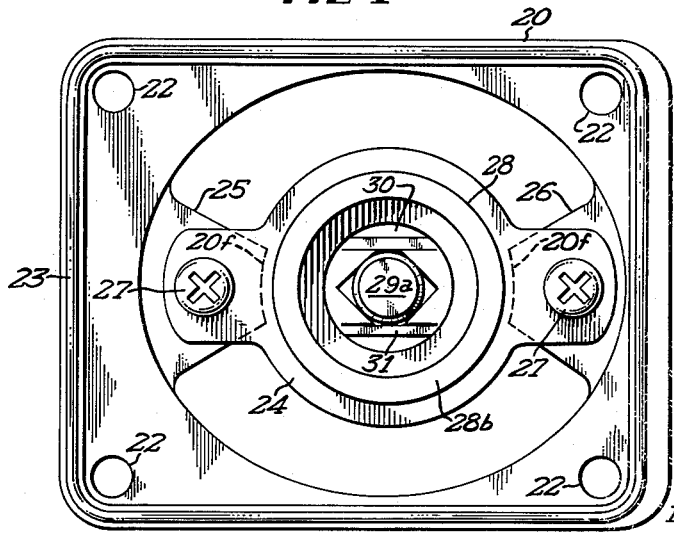
FIGURE 2 is a view of the valve sub-assembly as viewed along a line 2—2 of FIGURE 1.

The valve body is designated by the reference numeral 11 and has a threaded inlet opening 12, a threaded outlet opening 13, a partition wall 14 with an aperture 15 therethrough, and an opening 16 through the top thereof which is spaced slightly above the top surface of the partition wall 14. A groove 17 is formed in the upper edge of the valve body to permit a sealing gasket 18 to be deflected thereinto to help provide a gas tight seal therebetween.

A valve sub-assembly, generally designated by the reference numeral 19, comprises a housing 20 having a stepped bore therein extending from the top thereof to the bottom thereof and including bore portions 20a, 20b, 20c, 20d, 20e, 20f, and 20g, providing stepped shoulders 21a, 21b, 21c, 21e, 21f, and 21g at the base of the corresponding bore portions. Bolts (not shown) extend through bores 22, extending vertically through the housing 19, and are screw-threaded into aligned and threaded bores (not shown) in the valve body 11, to sealingly clamp the housing 19 to the valve body 11, with the gasket 18 therebetween. Peripheral rib 23 around the bottom surface of the housing 19 aligns with the groove 17 in the body 11 to deflect the gasket material thereinto to provide a good seal.

A valve seat member or saddle 24 spans the bore portion 20f and rests on and is held against pads or bosses 25 and 26 by means of bolts 27. The saddle has a downwardly off-set portion providing a valve seat surface 24a and is apertured at 24b to provide a gas passage therethrough. Extending through the aperture 24b is a rubber sealing sleeve 28 which has a head portion 28a that engages the valve surface 24a to retain the sealing sleeve on the saddle, and an outwardly off-set and downwardly extending annular portion 28b that is sufficiently long as to require compression thereof, when the housing is assembled on the valve body 11, to sealingly engage the partition wall 14 around the opening 15. It is thus seen that gas entering the inlet 12 will pass around the saddle and through the valve seat and sealing sleeve to reach the outlet 13.

A metallic valve disc 29, having a rubber washer 30 clamped to the bottom thereof and by means of a Tinnerman nut 31 surrounding a downwardly extending portion 29a of the valve disc, is held in position on the valve seat 24a by means of a helical compression spring, which rests at its larger end against the step 21e in bore 20e and surrounds an upwardly extending portion 29b of the valve disc. A valve stem in the form of a bolt 33, is screw-threaded into the valve disc 29 with the head of the bolt spaced upwardly from the upper end of the disc portion 29b.

A snap-acting mechanism, for actuating the valve 29, includes a movable fulcrum disc 34 positioned in the bore 20c and having a downwardly extending annular knife edge fulcrum rib 34a that is adapted to engage a snap disc along a circle spaced inwardly from the outer periphery thereof. The snap disc has radially-inwardly extending arms 35a that almost reach the threads of the bolt 33 so that as the arms move upwardly with respect to the valve disc, the ends of the arms 35a will engage the underside of the bolt head to lift the valve disc 29 off its seat. A ring 36 rests against the step 21c at the bottom of the bore 20c to serve as a pivot for the outer edge of the snap disc 35. The fulcrum member 34 has an upwardly extended and headed portion 34b that is adapted to be engaged by an actuating member for the valve.

A diaphragm 37 has a thickened and apertured central portion 37a, which surrounds the portion 34b of the fulcrum member under the head thereof, and a thickened peripheral portion 37b that rests on the step 21b at the bottom of the bore 20b. The periphery of the diaphragm is clamped against the step 21b by means of an outwardly extending flange 38a at the bottom of a guide sleeve 38.

An actuator for the snap-acting mechanism comprises a cylindrical cage 39 having a radially-inwardly extending flange 39a at the bottom thereof and a radially-inwardly extending flange 39b at the top thereof. The upper end of the guide sleeve 39 also has outwardly bent arms 39c which serve as abutment means for the upper end of a helical compression spring 40 extending between the arms 39c and the flange 38a to resiliently urge the flange 38a into clamping engagement with the diaphragm 37 and to bias the guide sleeve 39 in a direction away from the snap-acting mechanism. A washer-shaped member 41 rests on the upper surface of the flange 39a and has an annular groove around the inner periphery thereof in which the periphery of a spring washer 42 rests. A bearing button 43 is staked in the center opening of the spring washer 42 and is rounded at its lower surface to provide a point contact with the upper surface of the movable fulcrum 34. A cup-shaped member 44 is positioned coaxially within the cylindrical cage 39 and has an outwardly extending flange portion at its upper end, which provides abutment means for a coiled compression spring 45 that extends from the flange 44a to the upper surface of the washer 41. This spring is somewhat stronger than the spring 40 so that upon movement of the cup-shaped member 44 downwardly, the spring 40 will yield to cause the cage 39 to move along with the member 44.

While any type of means may be used to actuate the valve through the cup-shaped member 44 and cage 39, the preferred embodiment as illustrated in the drawing, consists of a conventional bellows 46 connected to a temperature responsive bulb 47b through a capillary tube 47. The bellows rests at its lower end in the bottom of the cup-shaped member 44 and bears at its upper end against an adjustable abutment member 48. The member 48 is screw-threaded into a cover member 49 which, in turn, is bolted to the top of the housing 20 by means of spaced bolts 50, only one of which is shown. The cover 49 has a slot 49a therein through which a projection 51 on housing 20 extends. The projection 51 is bevelled at 51a at the upper end thereof to serve as a pointer to cooperate with indicia (not shown) on the control knob 52 to show the setting of the valve. The cover member also has an upwardly struck portion 49b which extends upwardly into the hollowed-out portion of the knob, to cooperate with a stop 52a formed on the inner surface of the knob, to limit the rotary movement of the knob. The knob is non-rotatably secured to the upper end of the threaded abutment 48 by means of a bolt 53.

*Operation*

The valve is shown in its "off" position where it will stay until the temperature surrounding the bulb 47b drops below the control point at which the knob has been set. Upon such a dropping of the temperature, the lower end of the bellows 46 will move upwardly, due to the contraction of the fluid therein, which permits the spring 40 to move the cage 39 upwardly. When the cage has moved a sufficient distance so that the inherent bias in the snap disc 35 is relieved by the upward movement of the fulcrum member 34, the disc will snap upwardly and pick up the valve 29 by engaging the head of the bolt 33. The snap disc is aided in snapping over center by the flexibility of the spring washer 42 which is adapted to yield somewhat to enable the fulcrum member to move through the center position. In this upward movement of the bellows and cage 39, the cage is guided by the sleeve 38 which keeps the contact button 43 centered on the fulcrum member 34, thus assuring uniform operation of the valve actuating mechanism.

As the temperature surrounding the bulb rises above the control point, the lower end of the bellows will move downwardly against the bias of spring 40 and load the spring disc 42 to a force which is sufficient to move the fulcrum member 34 against the opposing force of the snap disc 35, with the slight aid of the light spring 32, to snap the fingers of the snap disc away from the valve stem head, to permit the valve to close under its own weight plus the bias of the light spring 32. Once again, the spring washer 42 aids in the movement of the fulcrum member by flexing downwardly as the oppoisng force of the snap disc reduces as it passes through its dead center position.

If after the valve has been closed by the above described movement, the temperature should continue to rise around the bulb, causing the lower end of the bellows to move down an additional distance, this additional movement is permitted by the compression of the spring 45 and the movement of the cup-shaped member 44 with respect to the cage 39. This provides a protective strain release to prevent damage to the clicker disc 35.

While I have described the preferred embodiment of the invention, it is deemed obvious that modifications may be made therein without departing from the spirit of the invention. Therefore, the scope of the invention should be determined from the appended claims.

I claim:

1. A gas valve comprising a valve body having an inlet and an outlet and an apertured wall therebetween, a valve seat surrounding the aperture in said wall, a valve cooperable with said seat to control gas flow therethrough, means including a rigid portion for actuating said valve, a diaphragm having a central portion sealingly engaging said actuating means and an outer peripheral portion resting against an inner wall portion of said valve body, a guide sleeve directly engaging said rigid portion of said actuating means, said guide sleeve having a portion engaging said peripheral portion, and resilient means extending between said actuating means and said sleeve portion forcing said peripheral portion sealingly against said wall portion and for biasing said actuating means in a valve opening direction.

2. A gas valve as defined in claim 1 wherein said sleeve portion is in the form of an annular flange.

3. In a gas valve the combination comprising a valve body having an inlet and an outlet and an apertured wall therebetween, a valve seat surrounding the aperture in said wall, a valve cooperable with said seat to control gas flow therethrough, snap-action means for actuating said valve, a diaphragm having a central portion sealingly engaging said snap-action means and an outer peripheral portion resting against an inner wall portion of said valve body, power means including a rigid member for actuating said snap-action means, a guide sleeve adapted to slidably receive said rigid member, said guide sleeve having a flange engaging said peripheral portion, resilient means extending between said power means and said flange for forcing said peripheral portion sealingly against said wall portion and for biasing said power means in a valve opening direction, a resilient disc having a central portion positioned to actuate said snap-action means and a peripheral portion arranged to be actuated by said power means.

4. The combination defined in claim 3 wherein said power means includes resilient means for actuating said resilient disc so as to yield before doing damage to said disc and said snap-action means.

5. A control valve comprising a valve body having an inlet and an outet and an apertured wall therebetween; a valve sub-assembly housing having a stepped bore therethrough and sealingly secured to said body; a valve seat member secured to the inner end of said housing substantially coaxial with said bore and sealingly engaging said wall around the aperture therein; a valve in the inner end of said bore and resiliently biased against said valve seat member; snap-action means in said bore and operably engaging said valve; a diaphragm sealingly engaging said snap-action means and having its marginal edge thereof sealingly engaging said bore; power actuating means at least partially within said bore and having a rigid portion thereof positioned to actuate said snap-action means; a guide sleeve adapted to slidably receive said rigid portion, said sleeve having a portion engaging said marginal edge; and resilient means extending between said sleeve portion and power actuating means to bias said power actuating means in a direction away from said snap-action means and to resiliently seal said diaphragm against said bore.

6. A control valve as defined in claim 5 wherein said power actuating means includes a hollow cylindrical member slideable in said guide sleeve, said cylindrical member having an inwardly extending abutment at one end thereof, and a resilient disc member positioned in said cylindrical member and yieldably bearing against said snap-action means and said abutment.

7. A control valve comprising a valve body having an inlet and an outlet and an apertured wall therebetween; a valve sub-assembly housing having a stepped bore therethrough and sealingly secured to said body; a valve seat member secured to the inner end of said housing substantially coaxial with said bore and sealingly engaging said wall around the aperture therein; a valve in the inner end of said bore and resiliently biased against said valve seat member; snap-action means in said bore and operably connected to said valve; a diaphragm sealingly engaging said snap-action means and having the outer marginal edge thereof resting on a step of said bore; power actuating means at least partially within said bore and having a rigid portion thereof positioned to actuate said snap-action means; a guide sleeve directly engaging said rigid portion, said guide sleeve having an annular portion engaging said marginal edge; and resilient means extending between said annular sleeve portion and said actuating means to bias said actuating means in a direction away from said snap-action means and to resiliently seal said diaphragm against said step.

References Cited by the Examiner
UNITED STATES PATENTS

| | | | |
|---|---|---|---|
| 2,690,875 | 10/54 | Jenkins | 236—48 |
| 2,928,645 | 3/60 | Loveland | 251—75 X |
| 2,993,646 | 7/61 | Jackson | 236—48 X |

M. CARY NELSON, *Primary Examiner.*